(12) United States Patent
Sarles et al.

(10) Patent No.: US 6,412,252 B1
(45) Date of Patent: Jul. 2, 2002

(54) SLOTTED INDUCTION HEATER

(75) Inventors: Frederick Williams Sarles, Lexington; Douglas A. Johnson, Groveland, both of MA (US)

(73) Assignee: Kaps-All Packaging Systems, Inc., Riverhead, NY (US)

( * ) Notice: Subject to any disclaimer, the term of this patent is extended or adjusted under 35 U.S.C. 154(b) by 350 days.

(21) Appl. No.: 08/964,572

(22) Filed: Nov. 5, 1997

Related U.S. Application Data

(60) Provisional application No. 60/058,312, filed on Sep. 9, 1997, provisional application No. 60/031,048, filed on Nov. 15, 1996, and provisional application No. 60/030,488, filed on Nov. 15, 1996.

(51) Int. Cl.$^7$ .............................. B65B 51/10; H05B 6/10
(52) U.S. Cl. ...................... 53/329.2; 219/632; 219/677
(58) Field of Search ................................ 53/329, 329.2, 53/329.3, 329.4, DIG. 2; 156/69; 219/677, 604, 632

(56) References Cited

U.S. PATENT DOCUMENTS

| | | |
|---|---|---|
| 3,477,197 A | 11/1969 | Budz |
| 3,748,422 A | 7/1973 | Schäfer |
| 3,763,342 A | * 10/1973 | Oppenheimer .............. 219/677 |
| 3,946,349 A | 3/1976 | Haldeman, III |
| 4,017,704 A | 4/1977 | Collins, III et al. |
| 4,095,390 A | 6/1978 | Knudsen |
| 4,114,009 A | 9/1978 | Kiuchi et al. |
| 4,122,321 A | 10/1978 | Cachat |
| 4,213,830 A | 7/1980 | Köppl |
| 4,237,360 A | 12/1980 | Pohlenz |
| 4,380,484 A | 4/1983 | Repik et al. |
| 4,488,668 A | 12/1984 | Flaska et al. |
| 4,506,131 A | 3/1985 | Boehm et al. |
| 4,516,104 A | * 5/1985 | McDermott ................. 219/677 |
| 4,707,213 A | * 11/1987 | Mohr et al. ................... 53/373 |
| 4,757,175 A | 7/1988 | Mohr et al. |
| 4,819,414 A | 4/1989 | Worden et al. |
| 4,825,625 A | 5/1989 | Hufford |
| 4,845,332 A | 7/1989 | Jancosek et al. |
| 4,853,510 A | 8/1989 | Mohr et al. |
| 4,891,484 A | 1/1990 | Waggott et al. |
| 4,899,025 A | 2/1990 | Kamp et al. |
| 5,022,531 A | 6/1991 | Horino et al. |
| 5,034,586 A | 7/1991 | Havas et al. |
| 5,059,762 A | 10/1991 | Simcock |
| 5,101,086 A | 3/1992 | Dion et al. |

(List continued on next page.)

FOREIGN PATENT DOCUMENTS

| | | | |
|---|---|---|---|
| DE | 4213830 | * | 11/1993 |
| EP | 0408230 | | 1/1991 |
| WO | 97/22523 | | 6/1997 |

OTHER PUBLICATIONS

Product Brochure, Lepel Cap Sealing, Product Selection Guide. No publication date available.

Product Brochure, Pillar Foiler Capsealing System, Pillar Technologies Ltd. Partnership. No publication date available.

"Coil Design Holds Key To Improving Induction Cap Sealing Efficiency," Ronald F. May, Journal of Packaging Technology Jan./Feb. 1991.

*Primary Examiner*—Stephen F. Gerrity
(74) *Attorney, Agent, or Firm*—Ostrolenk, Faber, Gerb & Soffen, LLP

(57) ABSTRACT

An induction sealing conveyor system includes an induction sealing unit coupled to an adjustment mechanism which adjustably positions the induction sealing unit with respect to a conveyor which moves a container to be sealed near a sealing head of the induction sealing unit. The sealing head includes ferrite cores and a litz wire coil formed on the ferrite cores which produces an electromagnetic field for hermetically sealing the container. The sealing head is entirely air cooled within the induction sealing unit.

15 Claims, 15 Drawing Sheets

U.S. PATENT DOCUMENTS

| | | | |
|---|---|---|---|
| 5,109,653 A | * 5/1992 | Kubis et al. | 53/373.7 X |
| 5,230,427 A | 7/1993 | Betts et al. | |
| 5,321,934 A | * 6/1994 | Bech | 53/329.2 X |
| 5,349,167 A | 9/1994 | Simcock | |
| 5,381,913 A | 1/1995 | Peeters | |
| 5,397,877 A | 3/1995 | Couffet et al. | |
| 5,430,273 A | 7/1995 | Bogdanski et al. | |
| 5,444,963 A | * 8/1995 | Steingroever et al. | 53/DIG. 2 |
| 5,461,215 A | 10/1995 | Haldeman | |
| 5,513,781 A | 5/1996 | Ullrich et al. | |
| 5,523,546 A | 6/1996 | Lake | |
| 5,822,669 A | * 10/1998 | Okabayashi et al. | 219/619 |
| 5,847,370 A | 12/1998 | Sluka et al. | |
| 5,848,319 A | * 12/1998 | Morigami et al. | 399/22 |
| 6,035,607 A | 3/2000 | Miller | |
| 6,043,471 A | 3/2000 | Wiseman et al. | |
| 6,078,033 A | 6/2000 | Bowers et al. | |

\* cited by examiner

Fig. 5b    Fig. 5c

VERSION I

VERSION II

SLOTTED INDUCTION HEATER

RELATED APPLICATIONS

This application claims the benefit of a prior provisional application Ser. No. 60/058,312 filed Sep. 9, 1997, the entire teachings of which are incorporated by reference herein. This application also claims the benefit of a prior abandoned U.S. Provisional Application, Ser. No. 60/030,488 filed Nov. 15, 1996, and Provisional Application Ser. No. 06/031,048 also filed Nov. 15, 1996.

BACKGROUND OF THE INVENTION

1. Field of the Invention

The present invention relates to an induction heating apparatus formed with slots on an interior portion thereof to assist with conduction of heat away from a central portion thereof.

2. Related Art

Induction sealing units for hermetically sealing a container with a foil sheet are typically included in conveyor systems for high volume applications. These systems usually have a flat or tunnel sealing heads mounted above a conveyor which carries a plurality of containers to be sealed into proximity with the sealing head.

The containers to be sealed are preconditioned to include a wax compound disposed between a foil sheet and the opening of the container. Usually, the foil sheet and wax compound are held in place by a screw-on or snap-on cap as is known in the art. Sometimes the wax compound is omitted and the foil sheet rests against a plastic material which forms the lip of the container.

Once the preconditioned container is brought within a predetermined distance from the sealing head, a coil within the sealing head produces an electromagnetic field near the foil sheet (or liner) which is disposed within the cap. The electromagnetic flux produced by the field causes the current to flow in the foil liner which causes the foil to heat and melt the wax compound (or the lip of the container). The molten wax (or plastic) adheres to both the foil liner and the opening of the container and, when the wax (or plastic) cools, an hermetic seal is produced. The downward force supplied by the cap ensures a proper bond between the foil liner and the opening of the container.

Typically, power supplies which include solid state switching circuits generate high frequency currents for delivery to the coil within the sealing head to produce the requisite electromagnetic field necessary to heat the foil liner. In addition, the coil in the sealing head is disposed around dense ferrite materials to channel the electromagnetic field and direct the field flux towards the foil liner for improved performance. Generally, the power supplies deliver approximately 2–4 kilowatts of power to the sealing head in order to properly seal the container.

In conventional systems, high currents are produced in the coil of the sealing head and, due to the relatively high resistance of the coil, results in the drastic elevation of the temperature of the coil and any surrounding structures. Therefore, the induction sealing units of the prior art employ hollow copper tubing when forming the coil in the sealing head to permit cooling water to flow through the hollow copper tube coil and cool the sealing head.

Unfortunately, the water cooling systems which cool the sealing heads (via hollow copper tubing coils) are expensive, bulky and inefficient. Indeed, such water cooling systems require water tubing, radiators, radiator fans, compressors and the like in order to adequately cool the system.

SUMMARY OF THE INVENTION

There exists a need for an induction heating unit which does not require expensive and bulky water cooling systems. Accordingly, it is an object of the present invention to provide an induction heating head which includes an slotted ferrite heating head. It is a further object of the present invention to provide an induction heating head which is more energy efficient.

In order to meet the objects of the invention as listed above and other objects, the present invention includes a housing, a plurality of ferrite cores disposed within the housing and a litz wire coil disposed adjacent the ferrite cores for producing an electromagnetic field. The cap sealing unit may also include a heat sink coupled to the housing, where at least some of the ferrite cores are bonded or operatively engaged to the heat sink for transferring heat thereto.

Other features and advantages of the present invention will become apparent from the following description of the invention which refers to the accompanying drawings.

BRIEF DESCRIPTION OF THE DRAWING

FIG. 2b is a side elevational view of the induction sealing unit of FIG. 2a;

FIG. 5b shows a bottom view of FIG. 5a;

FIG. 5c shows a side view of FIG. 5a;

DETAILED DESCRIPTION OF PREFERRED EMBODIMENT

Figure 1:
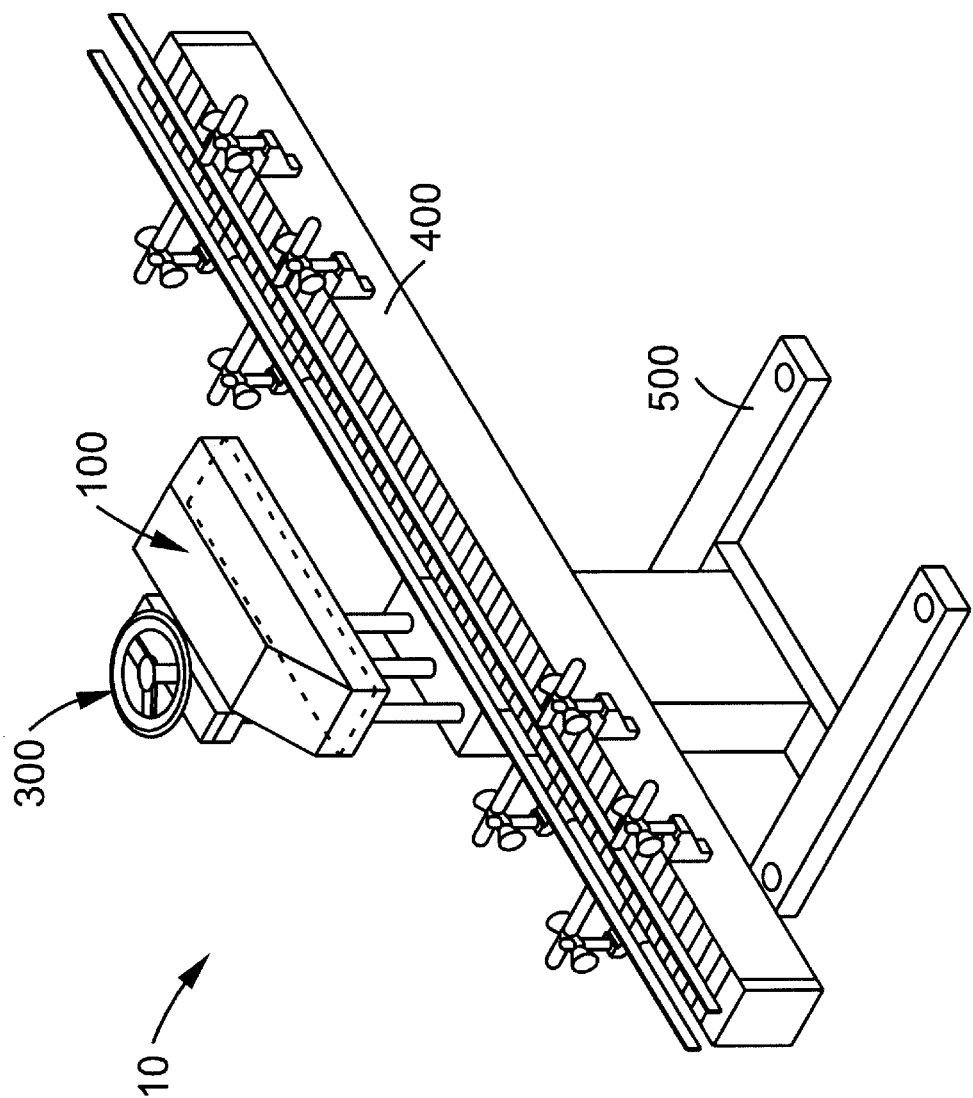
FIG. 1 shows a perspective view of an induction sealing conveyor system employing slotted ferrite heating head in accordance with the present invention.

With reference to FIG. 1, the induction sealing conveyor system 10 includes an induction sealing unit 100, an adjustment mechanism 300, a conveyor 400, and a base 500. The adjustment mechanism 300 adjustably couples the induction sealing unit 100 to the base 500. Thus, the induction sealing unit 100 may be raised or lowered with respect to the base 500 and the conveyor 400 for insuring that the induction sealing unit is the proper distance from a container to be sealed which travels down the conveyor 400. The adjustment mechanism 300 and the conveyor 400 are well-known in the art and, therefore, a detailed description relating thereto is omitted.

Figure 2B:
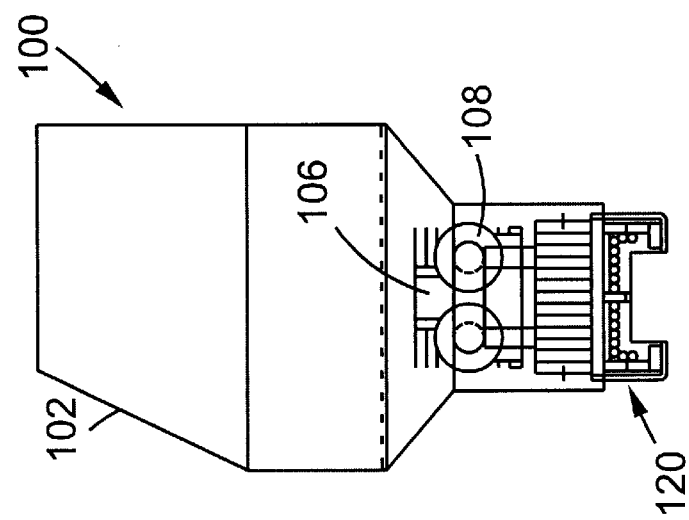
Figure 2A:
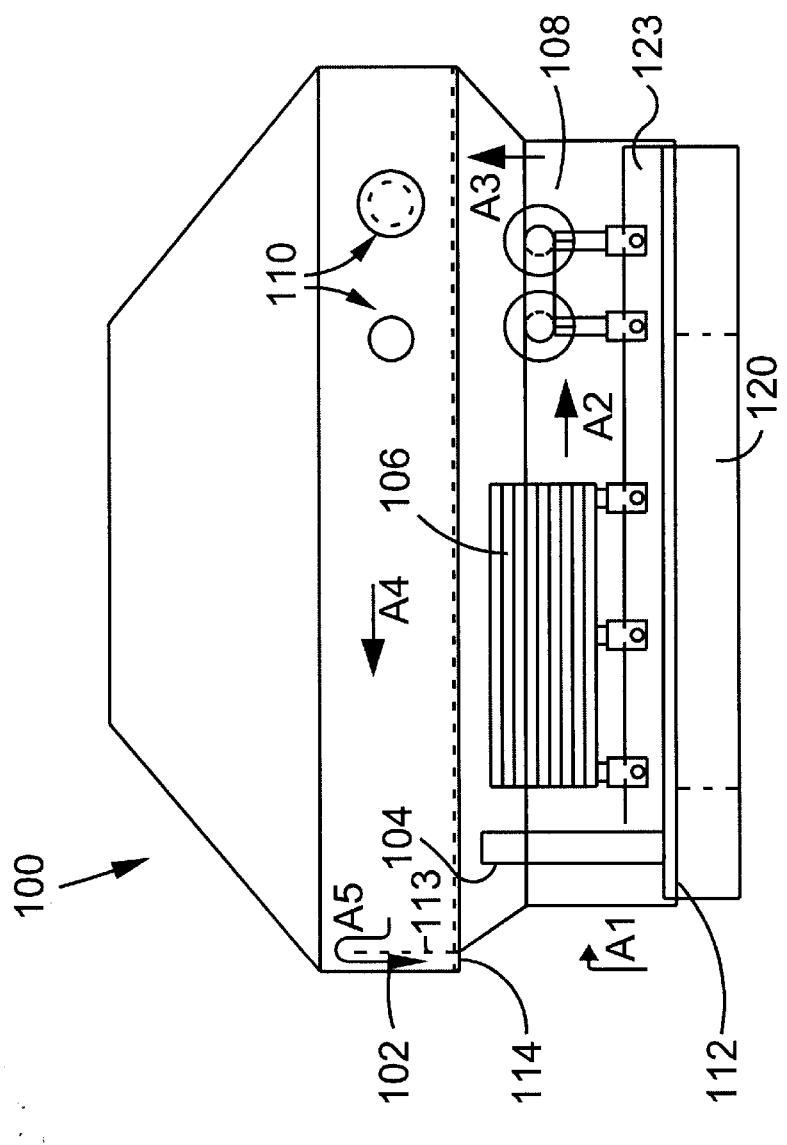
FIG. 2a is a front elevational view of an induction sealing unit employing the air cooled sealing head of the present invention.

FIGS. 2a and 2b show front and side elevational views of the induction sealing unit 100, respectively. With reference to FIG. 2a, the induction sealing unit comprises a housing 102 and start and stop switches 110 disposed on the housing 102 for activating and deactivating the induction sealing unit 100. The components within the housing 102 include a fan 104, a capacitor 106, a transformer 108, a sealing head 120 and power supply (not shown). The sealing head 120 extends from the bottom of the housing 102.

Figure 3:
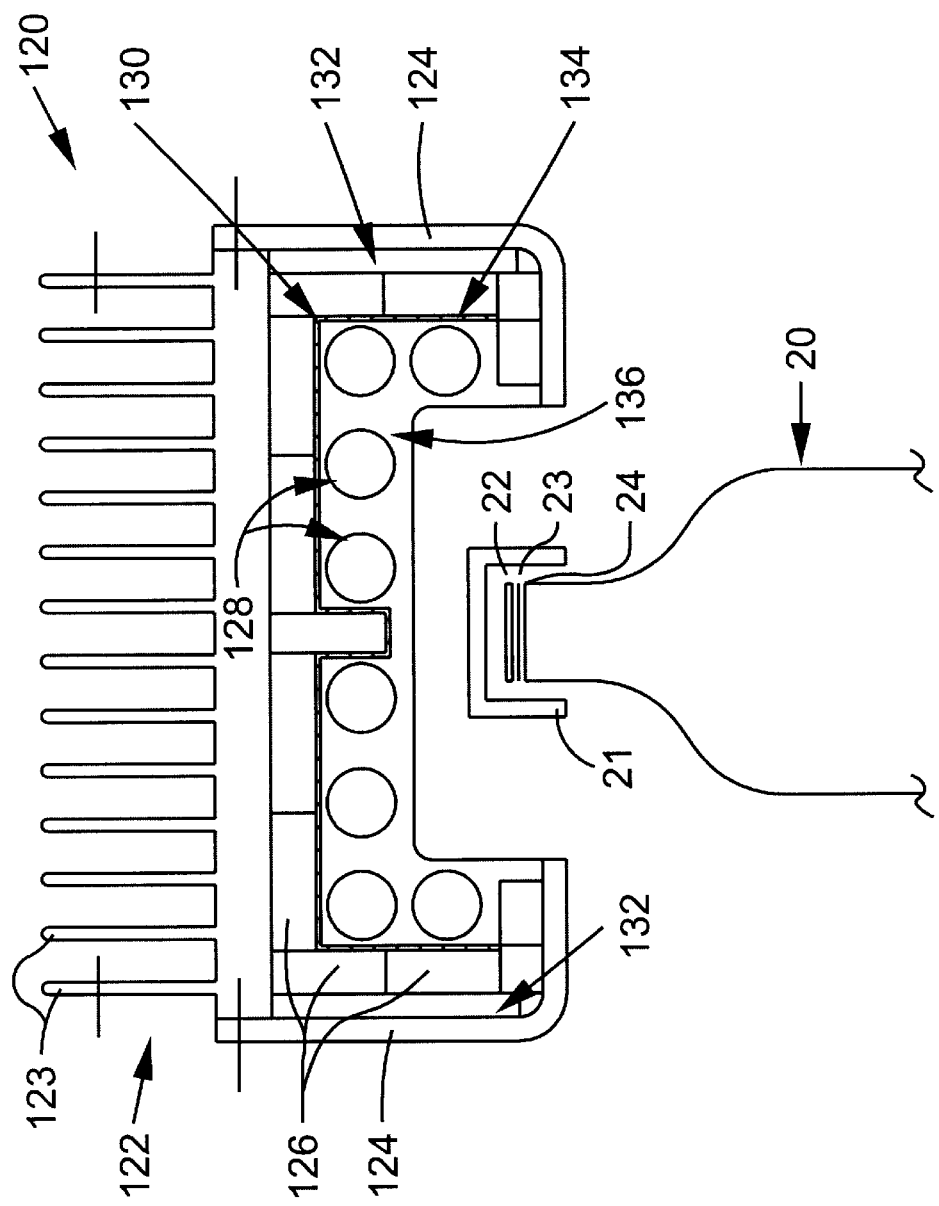
FIG. 3 is a cross-sectional view of the sealing head of the present invention.

FIG. 2b shows a cross-sectional view of the sealing head 120 extending from the bottom of the housing 102 and FIG. 3 shows an enlarged view of same. With reference to FIG. 3, the sealing head 120 includes a coil heat sink 122 having fins 123 extending upwards and away from heat generating portions of the sealing head 120 which will be described in more detail below. Further, the sealing head 120 includes a frame 124 coupled to the heat sink 122.

Disposed within the frame 124 are a ferrite core 126 and a litz wire coil 128 disposed adjacent to the ferrite core 126. Shims 132 may be disposed between the ferrite core 126 and the frame 124 to properly position the ferrite core 126 within the frame. The ferrite core 126 is operatively coupled to the underside of the coil heat sink 122 and may be operatively coupled to the shims 132 (if used). Sealing tape 130 may be disposed at the corners of the ferrite core 126 in order to prevent seepage of a potting compound 136 described below.

An electrically insulating and thermally conductive pad 134 may be disposed on the surface of the ferrite core 126 to electrically insulate the litz wire 128 from the ferrite core 126. The litz wire 128 has an insulating sheath (not shown) which also electrically isolates the litz wire 128 from surrounding structures, including the ferrite core 126.

A potting compound 136 is introduced into the area of the sealing head 120 defined by the frame 124, the ferrite core 126 and the litz wire coil 128 to lock the elements together and rigidly maintain the form of the structure.

Figure 5A:
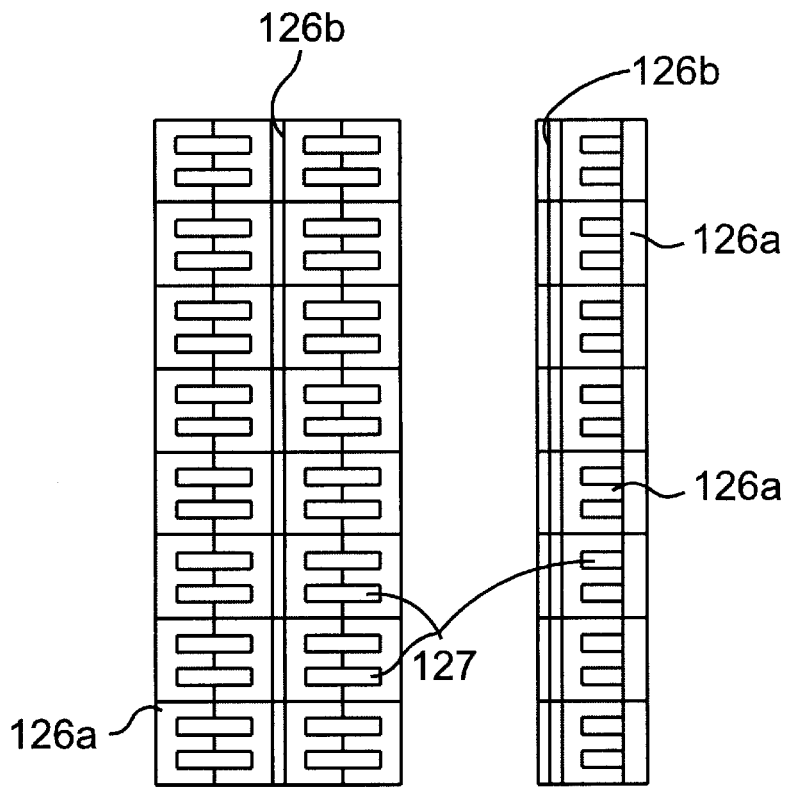
FIG. 5a is a cross sectional view of the ferrite core arrangement of the preferred embodiment of the present invention.
Figure 5A:
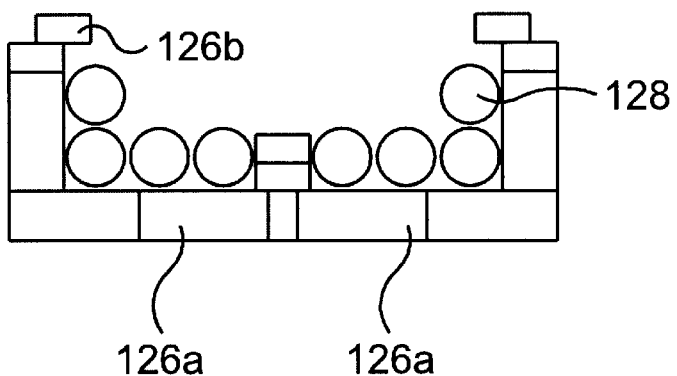

FIG. 5a shows a preferred construction for the ferrite core 126. Specifically, it is preferred that the ferrite core 126 be constructed from both "E" cores 126a and "I" cores 126b where the cores 126a, 126b are alternated and abutted to produce the final shape of the ferrite core 126. In the preferred embodiment of the present invention, about fifty-six (56) "I" cored 126b and about forty-eight (48) "E" cores 126a are employed to produce the ferrite core 126.

As shown in FIG. 5b, a bottom view of a first layer of cores 126a, 126b of the ferrite core 126 of FIG. 5a reveals a preferred arrangement of "E" cores and "I" cores. The arrangement is as follows: two oppositely disposed and abutting "E" cones 126a, followed by an "I" core 126b and, lastly, two oppositely disposed and abutting "E" cores 126a. It is noted that FIG. 5b is not in the same scale as FIG. 5a. Similarly, FIG. 5c shows a side view of the ferrite core 126 where FIG. 5c is also not in the same scale as FIG. 5a.

Reference is again made to the specific orientation of the "E" cores of FIGS. 5b and 5c. As shown, slots 127 are formed in the ferrite core 126 as a result of the oppositely abutting arrangement of the "E" cores 126a. One important feature of the slots 127 is that they provide an enlarged aggregate surface area from which to remove heat from the ferrite core 126. Indeed, ferrite material is not particularly conducive to conducting heat and the inclusion of slots 127 provides a useful means for removing heat from the ferrite material. It is noted that the "E" cores 126a are manufactured with the slots 127 therein: however, the particular arrangement of the slots 127 as shown in FIGS. 5b and 5c insure that the slots 127 form a "channel" which is directed to or towards the heat sink 122.

The slots 127 may be filled with a high aluminum content, thermally conductive material to provide a path for heat to be carried from the ferrite core 126, specifically the "E" cores 126a and "I" cores 126b, to the heat sink 122. It is most preferred that the slots 127 be filled with a ceramic material, such as AREMCO CERAMACAST™ 510 powder (which is mixed with water and applied using the direction on the container thereof). The CERAMACAST™ 510 powder may be obtained from AREMCO Products, Inc. or from any of the known suppliers.

It is also noted that the slots 127 are oriented in a direction which is parallel to the direction of propagation of the field flux within the ferrite core 126. Therefore, the field flux within the ferrite cored 126 is not unnecessarily impeded.

In the construction of the sealing head 120, it is preferred that the ferrite cores 126a, 126b be first bonded to a slab of heat conductive material, for example aluminum, which material may be the heat sink 122 itself; however, it is most preferred that the ferrite cores 126a, 126b first be bonded to a separate aluminum slab (not shown) which is later mounted to the heatsink 122. A first layer of ferrite cores 126a, 126b (FIG. 5b) are bonded to the aluminum slab using an appropriate epoxy material, such as AREMCO No. 568 two part epoxy (applied and curved as directed on the containers thereof). The AREMCO No. 568 two part epoxy is aluminum filled for better ferrite-to-aluminum bonding.

Next, the ferrite core 126 is further assembled to include additional ferrite cores 126a, 126b which are bonded to the first layer of ferrite cores 126a, 126b (FIG. 5a). It is preferred that the ferrite-to-ferrite bond be accomplished using a suitable epoxy material, such as AREMCO No. 631 two part epoxy (applied as directed on the containers thereof). Thus, the basic shape of the ferrite core 126 as shown in FIG. 5a is achieved.

At this point in the assembly of the sealing head 120, the slots 127 of the ferrite core 126 are filled with the thermally conductive ceramic material as described above.

Figure 4A:
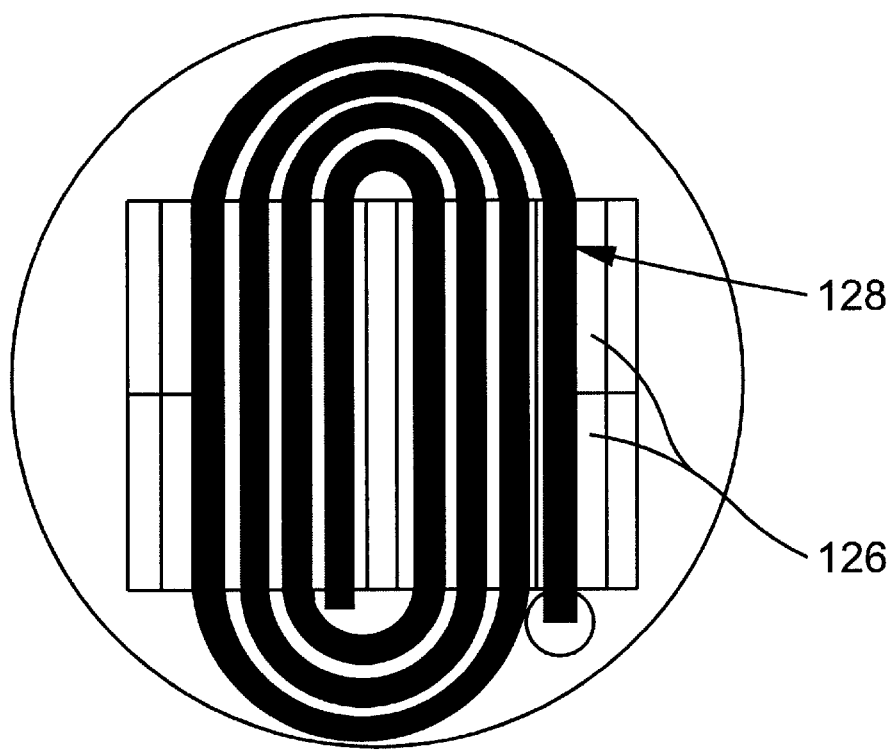
FIG. 4a is a bottom plan view of the coil and ferrite core of the present invention.

Next the litz wire 128 is disposed adjacent the ferrite core 126 as shown in FIG. 4a, i.e., in a coiled arrangement. It is noted that, for a conveyor system 10 (FIG. 1), the ferrite core 126 may be more elongate than that shown in FIG. 4a; however, it is understood that the length of the ferrite core 126 may be readily sized by one skilled in the art. The litz 128 is preferably bonded to the ferrite core 126 using a suitable epoxy material, for example AREMCO No. 526N two part epoxy (applied and cured as directed on the packages thereof).

As discussed above, sealing tape 130 (FIG. 3) may be disposed at the corners of the ferrite core 126 (in order to prevent seepage of a potting compound 136 described below) and an electrically insulating and thermally conductive pad 134 may be disposed on the surface of the ferrite core 126 (to electrically insulate the litz wire 128 from the ferrite core 126) prior to bonding the litz wire 128 to the ferrite core 126.

Next, the potting compound 136 is introduced into the area of the sealing head 120 defined by the frame 124, the ferrite core 126 and the litz wire coil 128 to lock the elements together and rigidly maintain the form of the structure. This is accomplished by any of the known methods, for example, by introducing a polyethylene mold into the area to define the outside surface contour of the potting compound 136 and then pouring the potting compound 136 into the area.

Referring now to FIGS. 2a and 2b, a power supply, which includes solid state switching components and control circuitry (not shown), provides driving current to the litz wire coil 128 (FIG. 2*a*). The capacitor 106 provides a source of capacitive reactance (C) for developing an LCR circuit with the resistance (R) and inductance (L) of the litz wire coil 128 and ferrite core 126. The transformer 108 properly matches the voltage and current sourced from the switching components of the power supply to LCR circuit.

The power supply generates high frequency currents within the litz wire coil 128 of the sealing head 120 to produce an electromagnetic field of sufficient strength to heat the foil liner 22 of the container 20 (FIG. 3). Typically, the power supply delivers about 2–4 kilowatts of power to the sealing head 120 in order to properly seal the container 20.

The present invention may be driven by prior art power supplies (which include control electronics and solid state switching components). For example, the power supply from the 2KW COMPAK™ System Induction Seal Cap Sealer of Enercon Industries Corporation, Menomonee Falls, Wis., may be used to drive the sealing head 120 of the present invention. When using the Enercon COMPAK™ System power supply, the sealing head 120 of the present invention may be driven using either the Enercon COMPAK™ System's capacitor and transformer of the capacitor 106 (1 uf) of the transformer 108 (having a step down ratio of 6:1) of the present invention.

The present invention contemplates using power supplies which deliver substantially higher currents (preferably 4 times higher than the prior art power supplies) to the litz wire coil 128 because the litz wire coil 128 has superior current handling properties over the prior art water cooled coils. The specific advantages of using a litz wire coil 128 are discussed in more detail below.

It is noted that the series LCR circuit has a Q factor which is a function of the specific values of the inductance (L) of the litz wire coil 128 and ferrite core 126 combination, the capacitance (C) of capacitor 106 and the resistance (R) of the litz wire coil 128. The transfer function of the LCR circuit has a peak gain value at resonance which increases with increased Q. Since, in an LCR tuned circuit (as is present in the sealing head 120 of the preferred embodiment of the present invention), the Q factor is inversely proportional to R, the Q factor of the sealing head 120 is much higher than the Q factor of conventional sealing heads.

Consequently, there is very little room for error in providing current having a proper frequency to the tuned LCR circuit. Indeed, as the frequency of the delivered current moves away from resonance, the gain of the LCR circuit is greatly reduced and the current falls below that which is necessary to properly heat the foil liner 22. It is noted that the prior art sealing heads also have Q factors; however, such Q factors of the prior art are much lower than that of the preferred embodiment of the present invention.

Therefore, it is preferred that the electronics, specifically the control electronics of the power supply, contain circuitry which maintains the frequency of the delivered current to the sealing head 120 (specifically, the LCR circuit) at or near resonance.

Figure 6:
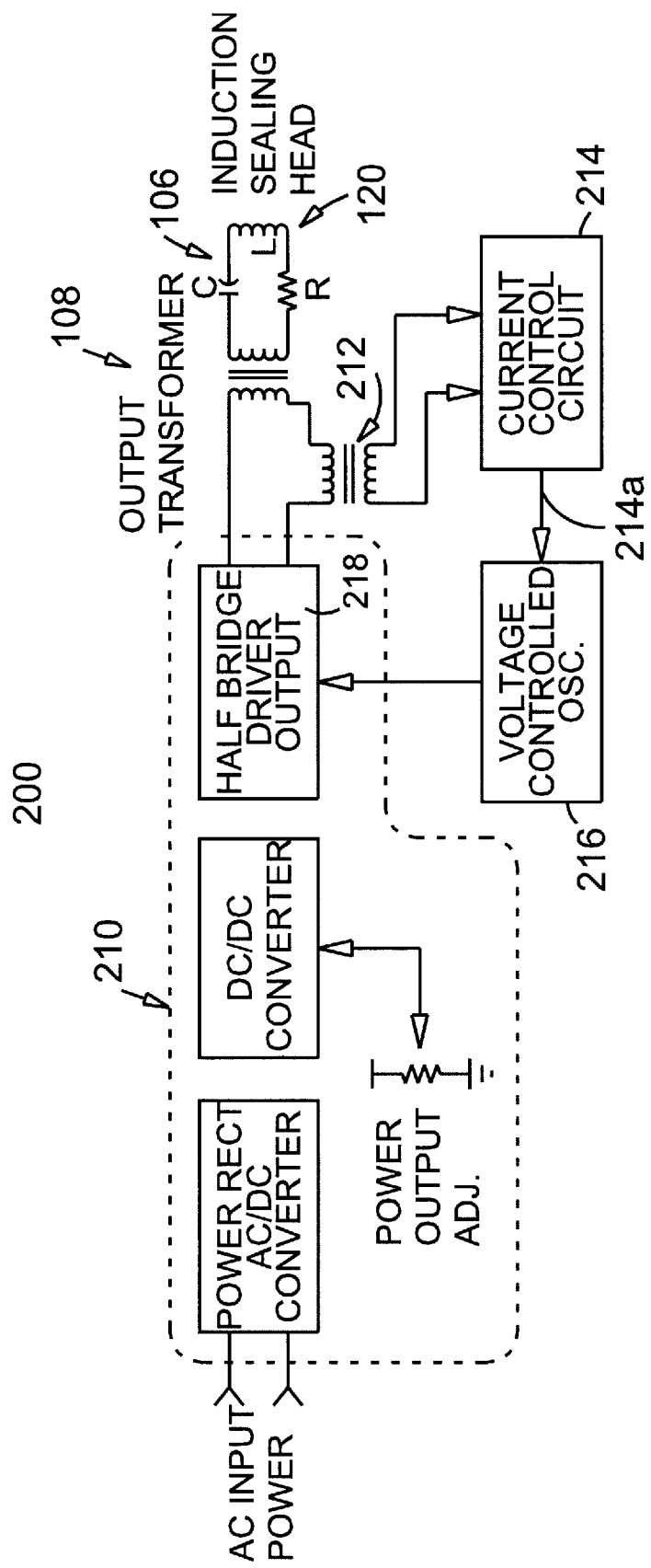
FIG. 6 is a block diagram of a preferred power supply for driving the sealing head of the present invention.
Figure 7:
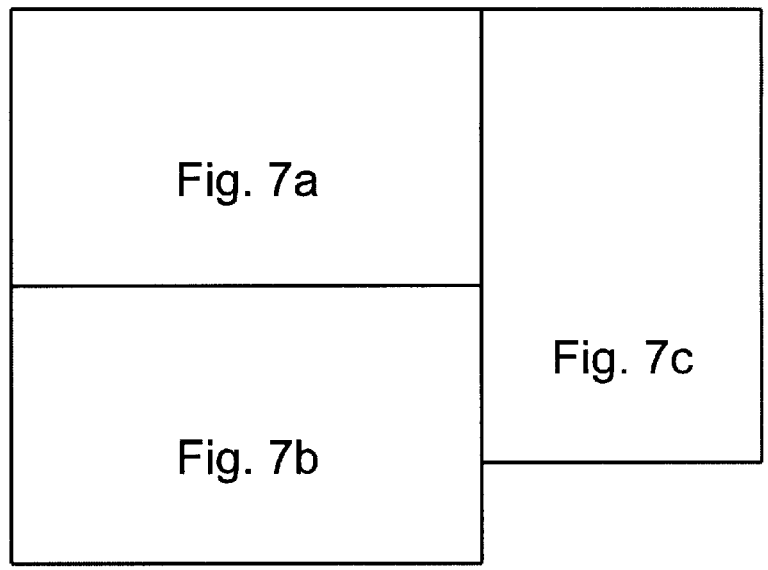
FIGS. 7–10 show a preferred circuit of the power supply of FIG. 6.
Figure 8:
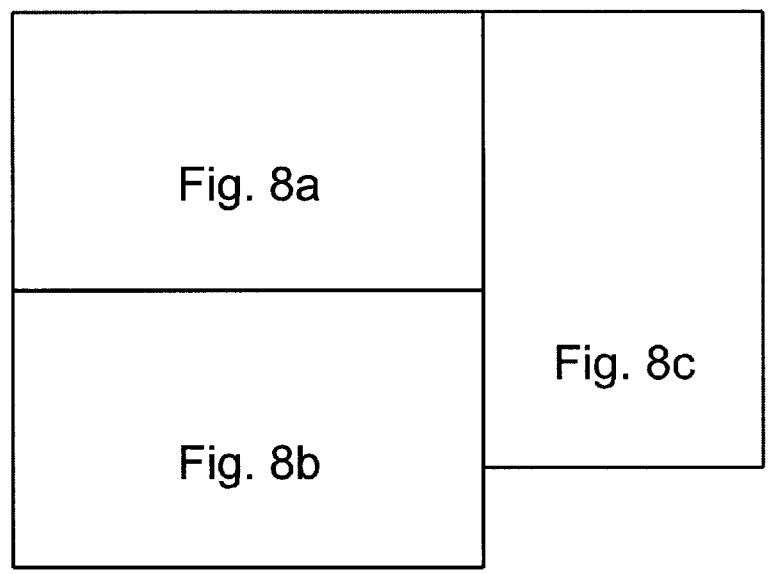
Figure 7A:
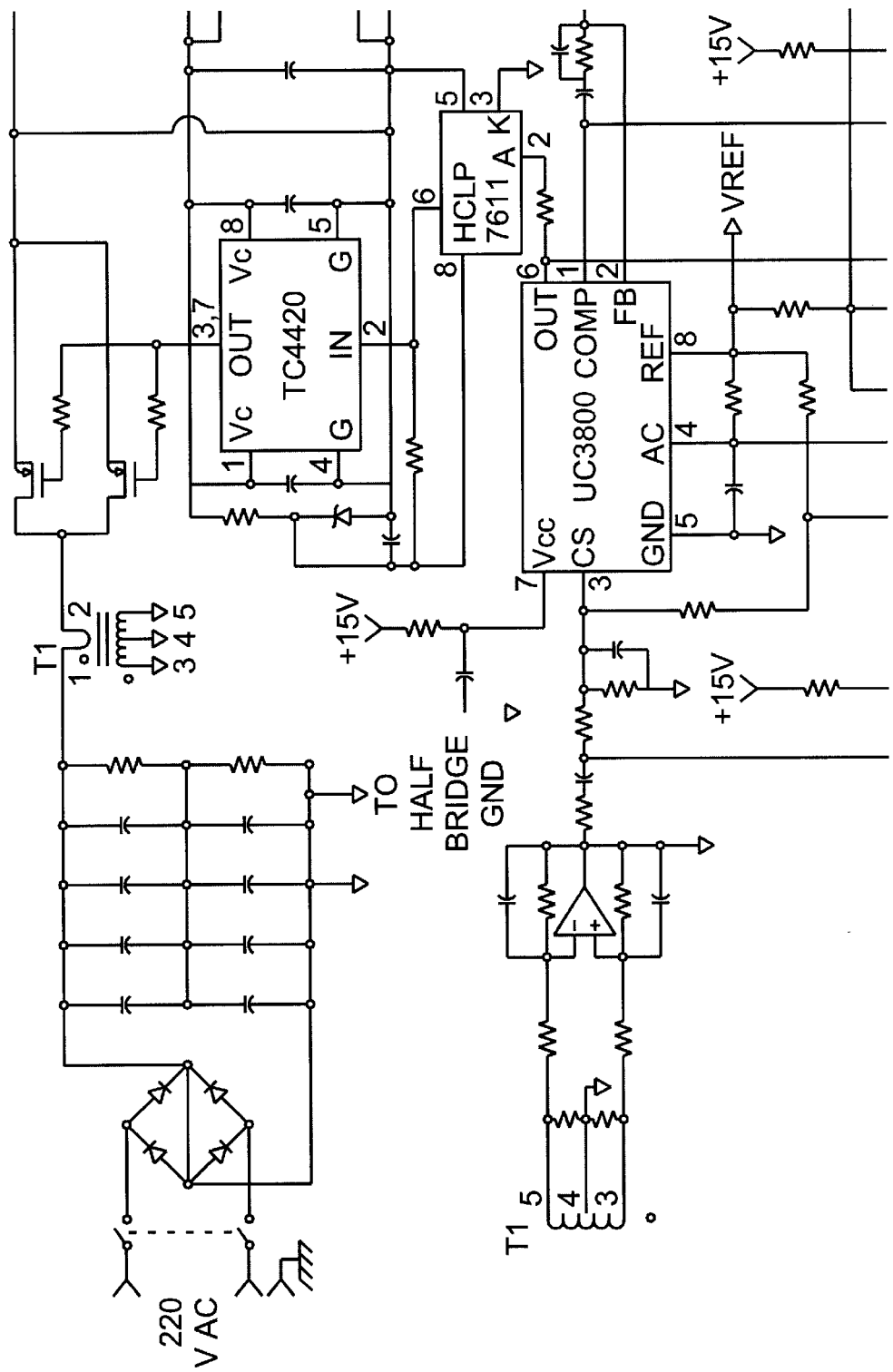
Figure 7B:
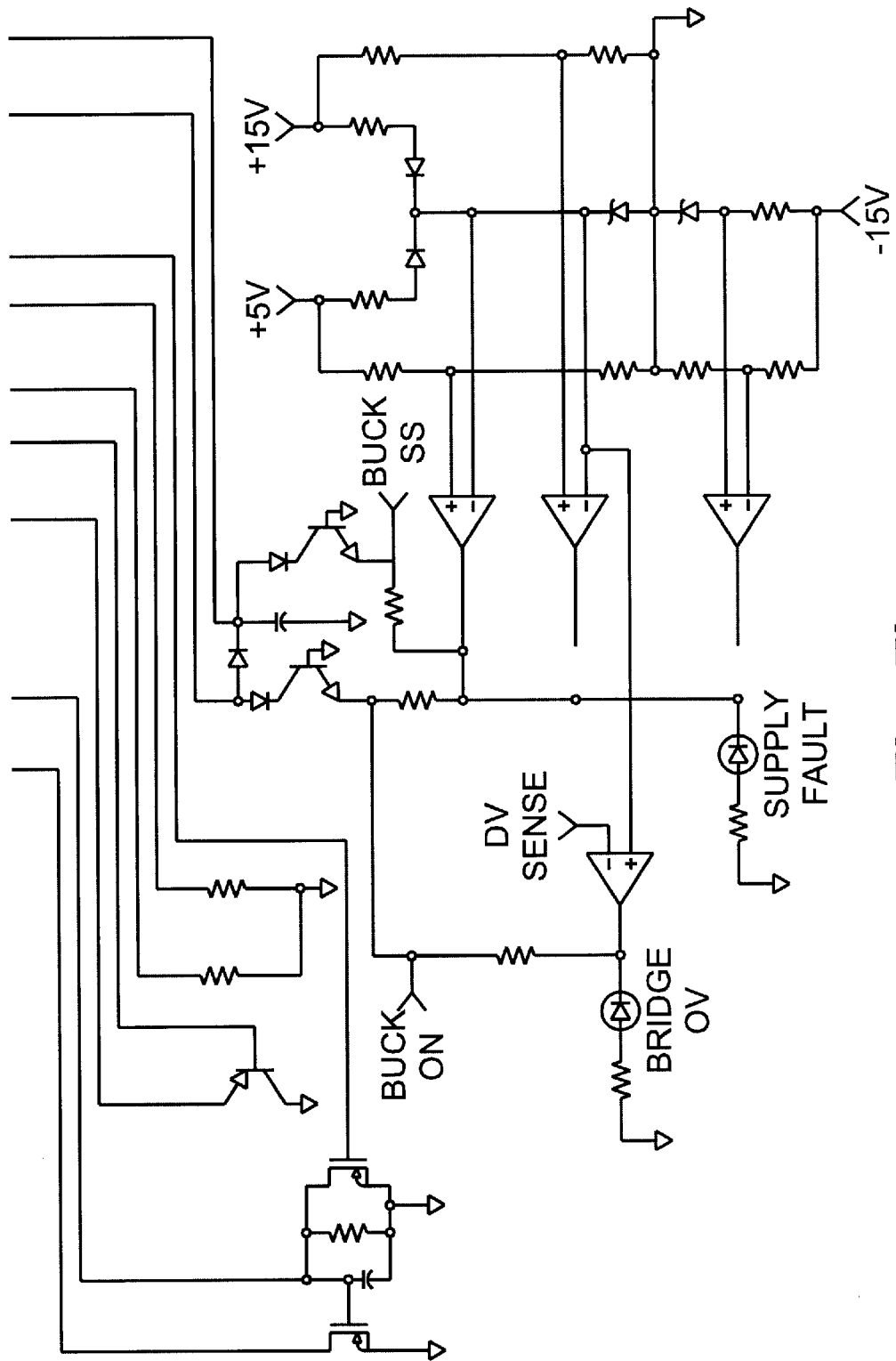
Figure 7C:
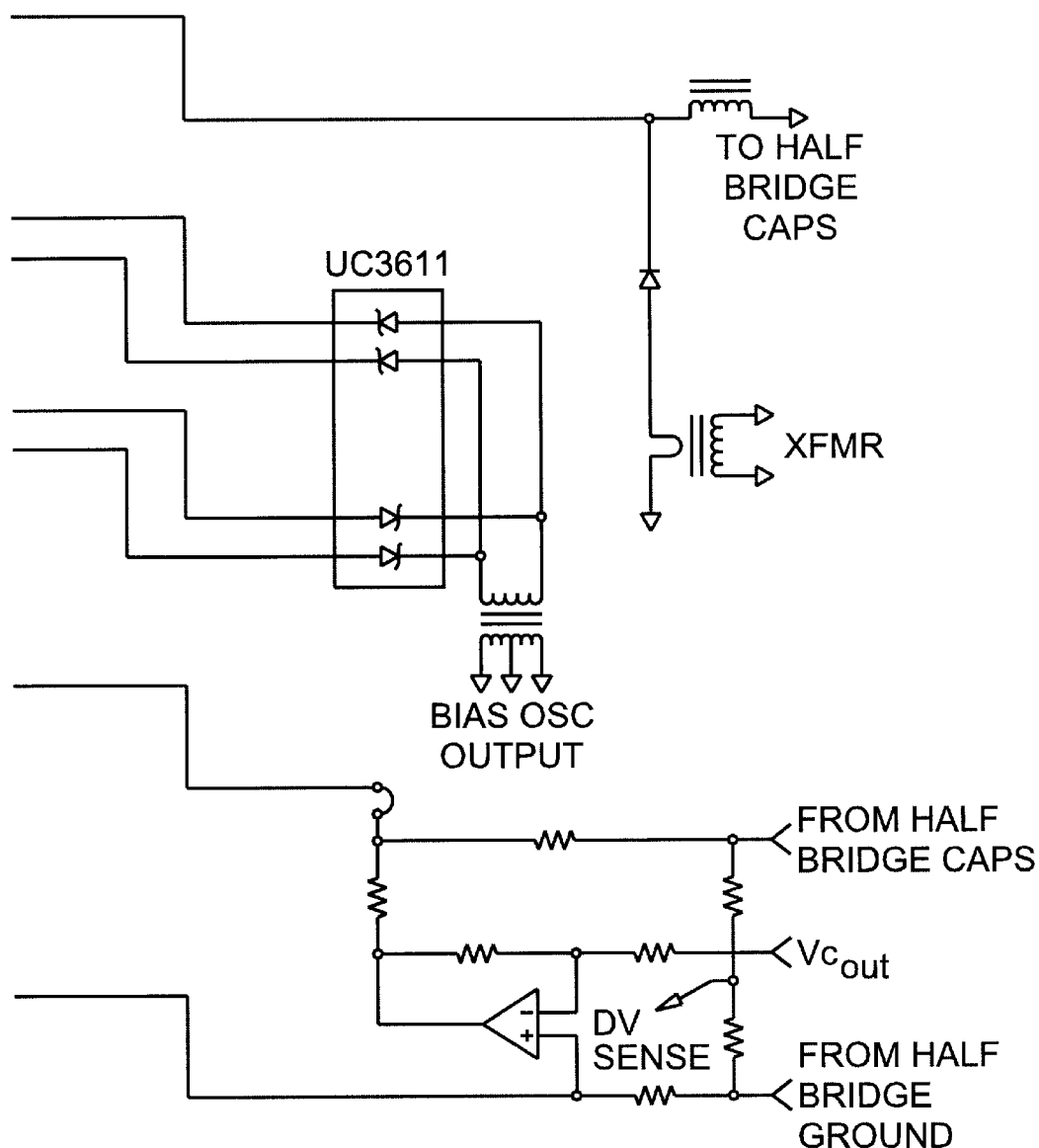
Figure 8A:
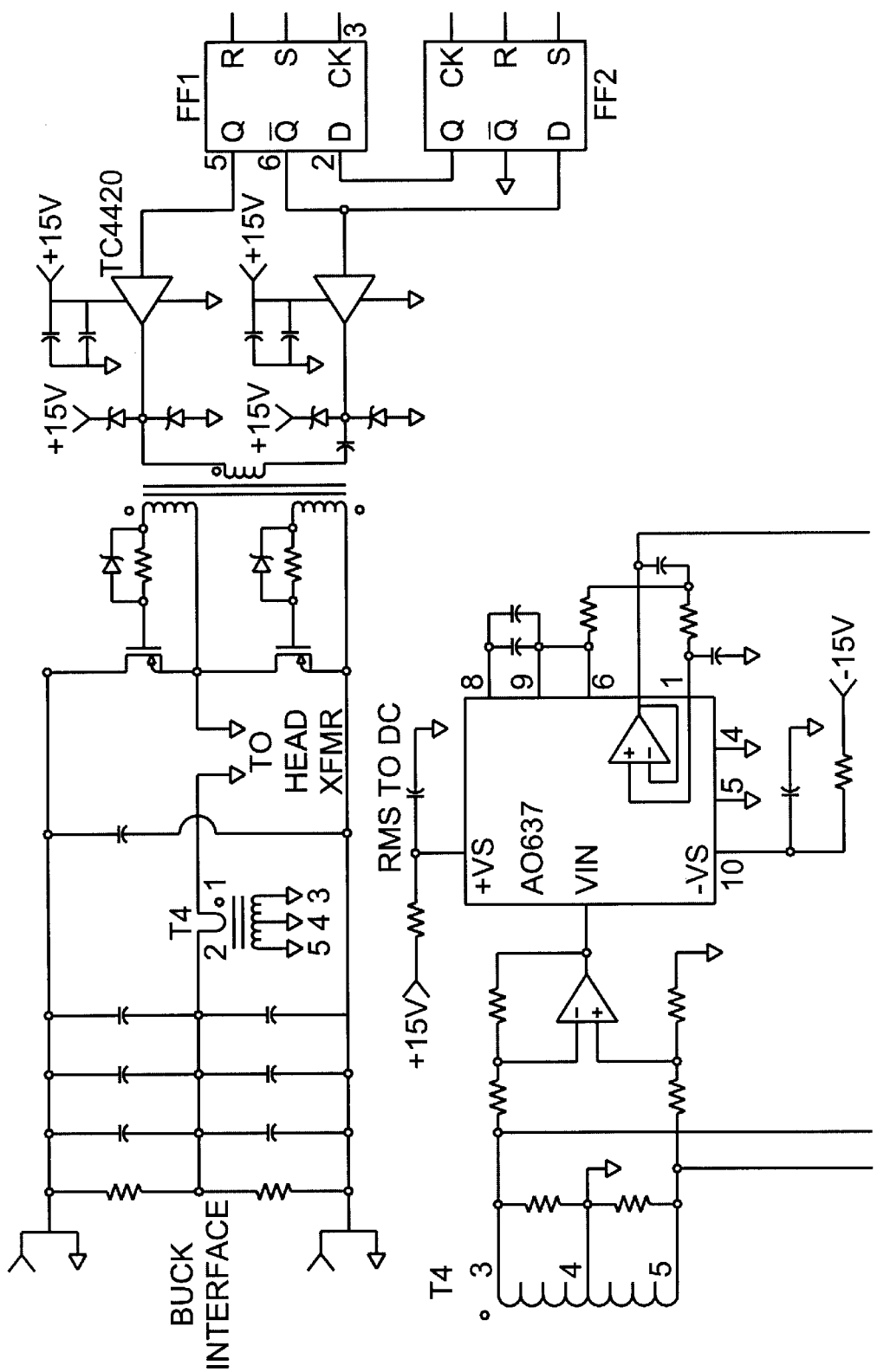
Figure 8B:
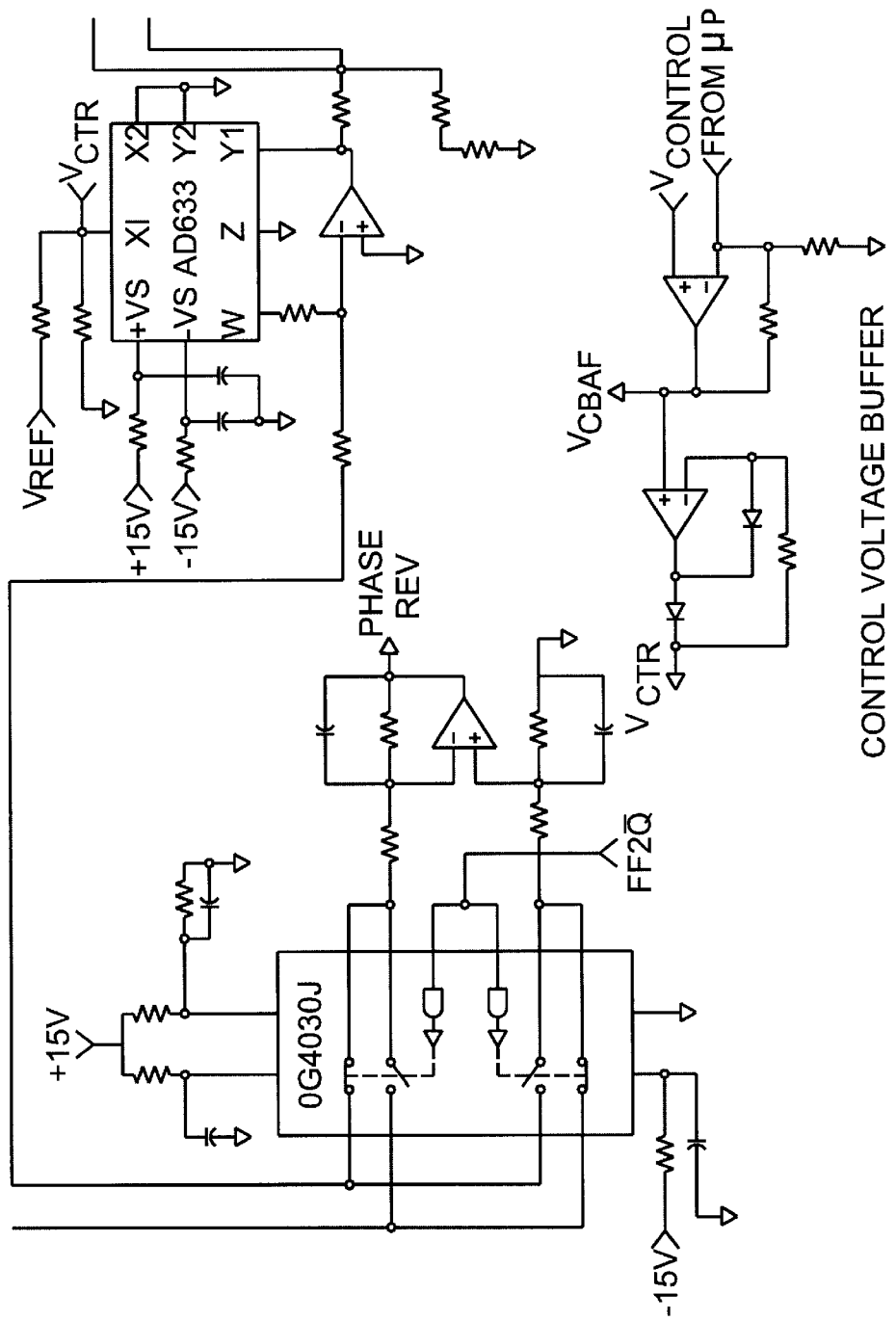
Figure 8C:
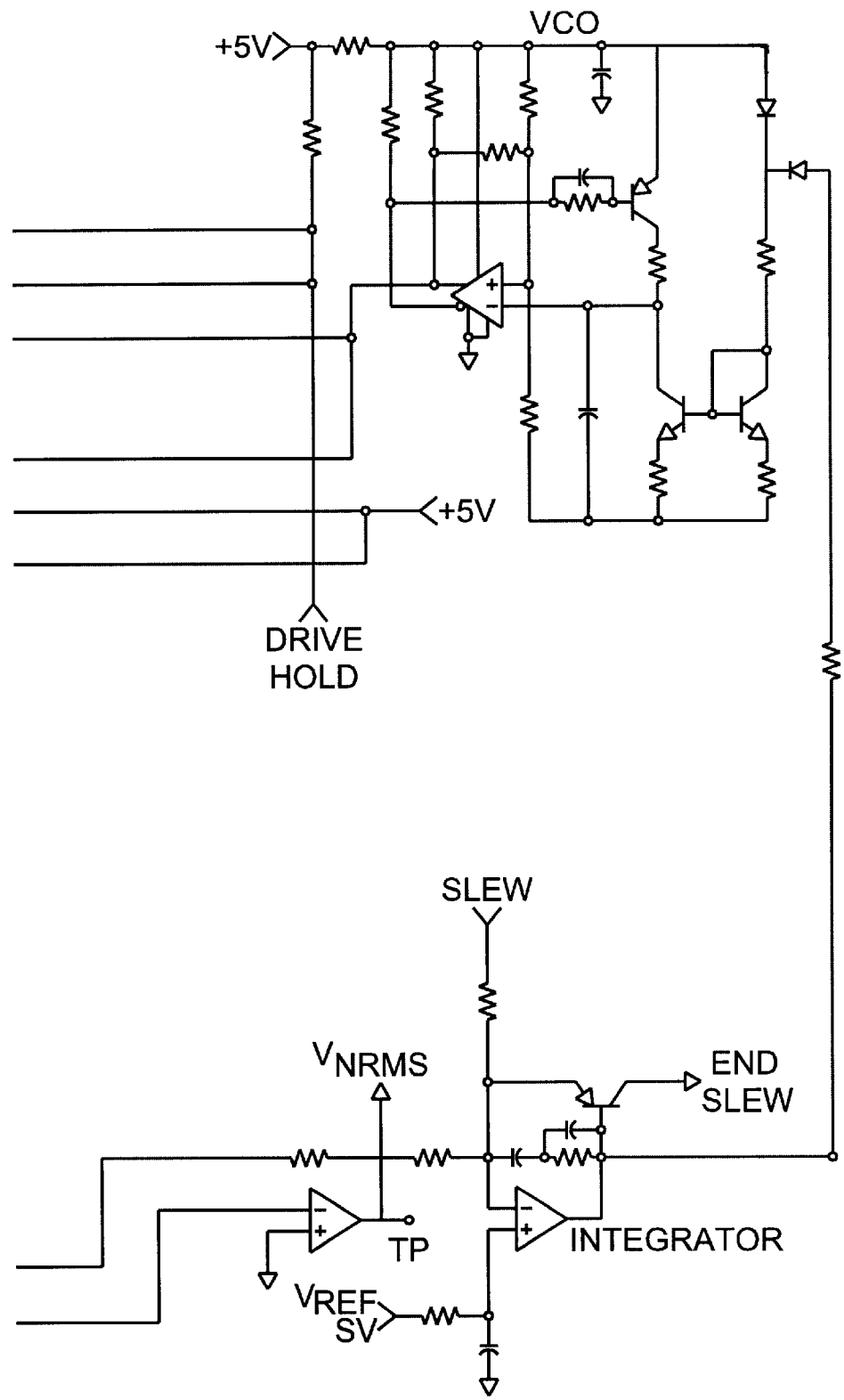
Figure 9:
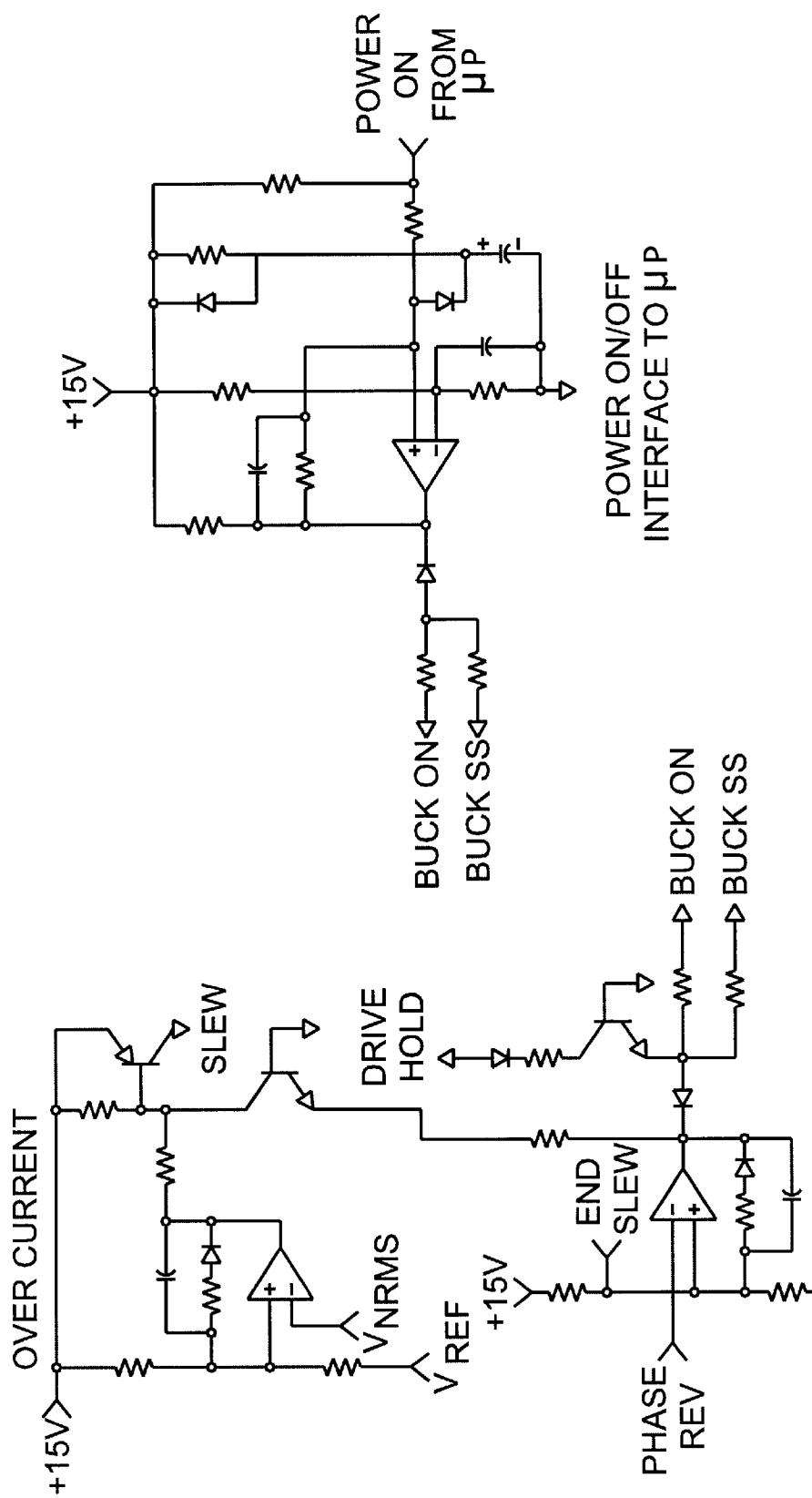
Figure 10:
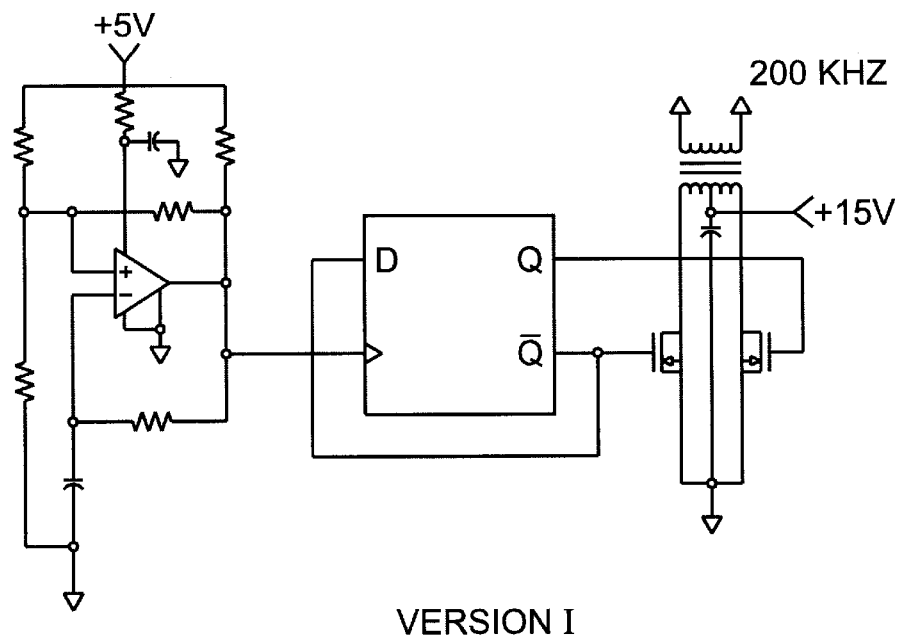
Figure 10:
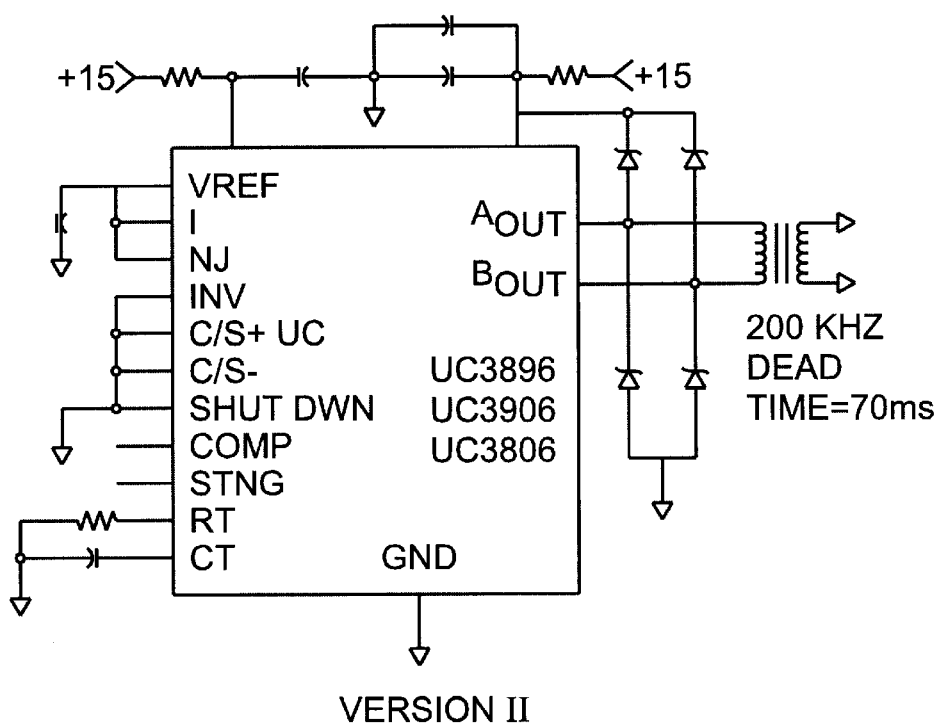

Reference is now made to FIG. 6 which shows a block diagram of a preferred power supply 200 for driving the sealing head 120 of the present invention. The power supply 200 includes a power stage 210 (having the solid state semiconductor components therein, i.e., the half bridge driver 218) and control circuitry (having a current sense transformer 212, a current control circuit 214 and a voltage controlled oscillator (VCO) 216 therein).

The operation of the power supply 200 will now be described. The current in the primary of the transformer 108 is sensed by the current sense transformer 212 and is delivered to the current control circuit 214. Thus, the current control circuit 214 utilizes a signal which is indicative of the current which flows in the sealing head 120 (specifically, the tuned LCR circuit). The current control circuit 214 outputs a signal on line 214*a* which changes if the current in the sealing head 120 deviates from an optimal level. The signal on line 214*a* controls the output frequency of the VCO 216.

The VCO 216 controls the switching characteristics of the half bridge driver circuit 218, which circuit 218 controls the frequency of the current delivered to the transformer 108 and, ultimately, the frequency of the current delivered to the sealing head 120. Thus, the output frequency of the power supply 200 is a function of current flow in the sealing head 120. As discussed above, if the frequency of the current delivered from the power supply 200 deviates from an optimal level, the current in the sealing head will vary greatly (due to the high Q of the LCR circuit). However, the control circuit of the power supply 200 maintains the current in the sealing head 120 at a desired level (by controlling the frequency of the current delivered thereto) even if the Q of the LCR circuit drifts or the output frequency of the power supply 200 attempts to deviate from optimal.

FIGS. 7–10 are included to show specific circuit diagrams of electronics which can produce the function of the power supply 200 as described above. It is noted that the specific circuit components and interconnections shown in FIGS. 7–10 merely represent one workable embodiment of the power supply 200 and the invention as claimed is in no way limited thereby.

Figure 4B:
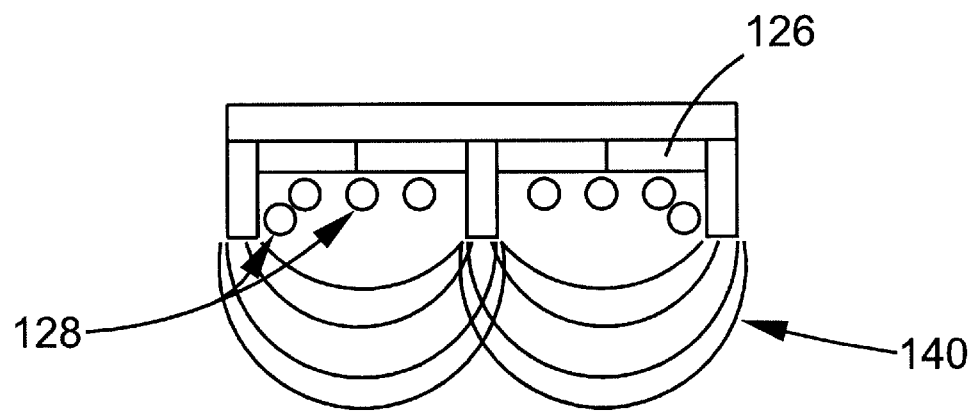
FIG. 4b is a cross-sectional view of FIG. 4a which includes a schematic representation of the flux lines of an electromagnetic field produced by the coil and ferrite core of the sealing head.

The litz wire coil 128 is disposed around the ferrite core 126 to channel the electromagnetic field and direct the field flux towards the foil liner 22 from proper performance. With reference to FIG. 4*a*, the litz wire 128 is coiled around the ferrite core 126 such that the electromagnetic field developed around the litz wire 128 is channeled into the ferrite core 126. The positioning and shape of the ferrite core 126 within the frame 124 directs the electromagnetic field to propagate near an end of the container 20 to be sealed (FIG. 3 and FIG. 4*b*).

The container 20 includes a screw-on or snap-on cap 21, a foil liner 22, a wax compound 23 (optional) and a container lip 24. When the electromagnetic flux 140 passes through the foil liner 22, a current is produced in the foil liner 22 causing the foil liner to heat. The heating of the foil liner causes either the wax compound 22 or plastic material of the container lip 24 to heat and melt. When the wax compound 23 or the plastic material of the container lip 24 cools, the container 20 is hermetically sealed.

The high currents flowing in the litz wire coil 128 and the resultant high electromagnetic field which is concentrated within the ferrite core 126 cause an elevation in the temperatures of the coil 128 and the core 126 which results in an overall rise in the temperature of the sealing head 120. The coil heat sink 122 operates to dissipate the heat that is generated within the ferrite core 126 and the litz wire coil 128. As discussed above, the ferrite core 126 is advantageously provided with slots 127 which are preferably filled with a high thermal conductivity ceramic material to carry heat from the ferrite core 126 to the heat sink 122.

Advantageously, the litz wire coil 128 has a very low resistance to the flow of current therein as compared to conventional copper tubing used in prior art devices. More specifically, since high frequency currents tend to flow near the surface of wire (known as the "skin effect") the use of multi-strand litz wire in the coil 128 reduces the resistance of the coil 128 to current flow. Litz wire having about 4,000 strands of individually insulated conductors have been available commercially. However, it is most preferred that litz wire having 10,000 insulated strands therein be used in the litz wire core 128. Such 10,000 strand litz wire has been specially manufactured for use in the present invention.

Thus, in accordance with the preferred embodiment of the present invention, the litz wire coil 128 is sized such that the effective resistance per unit length is only about 0.1–0.01 that of the copper tubing of the prior art. Consequently, the heat produced within the litz wire coil 128 (due to $I^2R$ losses) is reduced by a factor of 10–100 and water cooling of the sealing head 120 is not required. Indeed, the coil heat sink 122 provides all the heat dissipation necessary to safely and efficiently operate the induction sealing unit 100.

With reference to FIG. 2a, cooling air is drawn into vent slots 112 by the fan 104 in the direction shown by arrow A1. Next, the air passes over the capacitor 106, the transformer 108 and the fins 123 of the coil heat sink 122 in the direction shown by arrow A2. The air removes the heat from the capacitor bank 106, the transformer 108 and, most importantly, the fins 123 of the heat sink 122. The air that has passed over the heat sink fins 123 then moves into a upper area of the induction sealing unit 100 in the direction shown by arrow A3. It is preferred that the power supply (control electronics and solid state switching components) be disposed in the upper area of the sealing unit 100.

Next, the air moves across the upper volume of the sealing unit in the direction of arrow A4 (preferably removing heat from the power supply). Lastly, the air moves past a baffle member 113 in the direction shown by arrow A5 and through opening 114 into the atmosphere. Thus, heat generated by the sealing head 120 is removed therefrom, thereby maintaining the sealing head 120 at a safe operating temperature without requiring water cooling as in the prior art.

The foregoing description of the preferred embodiment of the invention has been presented for the purposes of illustration and description. It is not intended to be exhaustive or to limit the invention to the precise form disclosed. Many modifications and variations are possible in the light of the above teaching. It is intended that the scope of the invention be limited not by this detailed description but rather by the claims appended hereto.

What is claimed is:

1. An induction heating unit, comprising:
    a frame;
    a ferrite core assembly comprising a plurality of ferrite cores disposed within the frame, the ferrite cores arranged adjacent one another so as to form slots therebetween;
    a heat conductive material disposed between the slots formed between the ferrite cores, for providing a path for heat conduction along the slots and away from an interior portion of the ferrite core assembly; and
    a Litz wire coil disposed adjacent the ferrite core assembly for producing an electromagnetic field.

2. The induction heating unit of claim 1, further including a heat sink coupled to the frame, wherein at least some of the ferrite cores are operatively coupled to the heat sink via the path for heat conduction and for transferring heat thereto.

3. The induction heating unit of claim 2, wherein the heat sink includes fins for transferring heat from the heat sink to air passing over the fins.

4. The induction heating unit of claim 3, further comprising a fan for blowing air over the fins.

5. The induction heating unit of claim 4 wherein the fan pulls air through an opening in the housing such that the air flows over the fins of the heat sink and then out through a vent in the housing.

6. The induction heating unit of claim 2 further comprising a housing, the heat sink extending at least partially into the housing.

7. The induction heating unit of claim 6, further comprising a capacitor bank and a transformer being disposed near the fins of the heat sink and the fan blowing air on the capacitor bank and transformer.

8. The induction heating unit of claim 1 further including a potting compound disposed in a volume defined by the frame, the ferrite cores and the Litz wire, for securing the ferrite cores and Litz wire within the sealing unit.

9. An induction heating unit comprising:
    a ferrite element, the ferrite element having slots formed within an interior portion thereof;
    a thermally conductive material disposed within the slots to procde a thermal conductive path for transferring heat away from the interior of the ferrite element; and
    a wire coil disposed about the ferrite element for producing an electromagnetic field.

10. An induction heating unit as in claim 9 wherein the ferrite element is formed of a plurality of shaped ferrite cores disposed adjacent one another to form the slots in the ferrite element.

11. An induction heating unit as in claim 10 wherein the plurality of ferrite cores additionally comprise a plurality of opposing adjacent E-shaped cores.

12. An induction heating unit as in claim 10 wherein the plurality of ferrite cores additionally comprise a plurality of opposing I-shaped cores.

13. An induction heating unit as in claim 9 wherein the thermally conductive material is a ceramic cement.

14. An induction heating unit as in claim 9 wherein the wire coil is formed from multi-stranded Litz wire.

15. An induction heating unit as in claim 9 wherein the slots are elongated slots having a longest dimension oriented in parallel with a direction of propagation of field flux of the electromagnetic field.

* * * * *